Aug. 29, 1933.  R. W. BABSON  1,924,533
AUTOMOBILE PARKING METER WITH THEFT ALARM
Filed Aug. 22, 1929  2 Sheets-Sheet 1
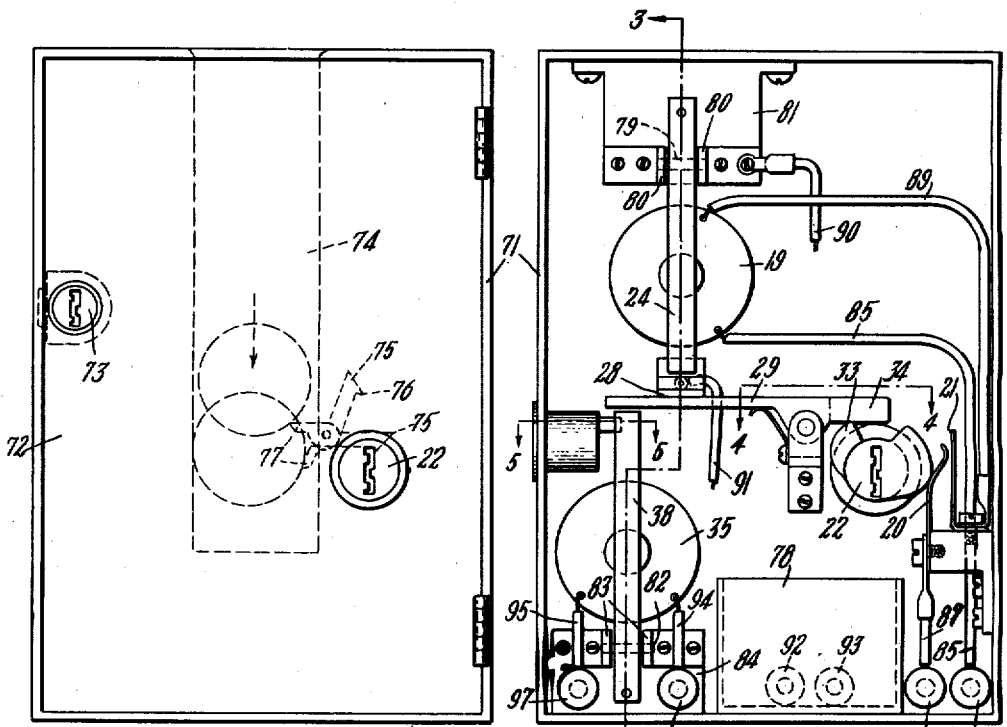
Fig. 1
Fig. 2
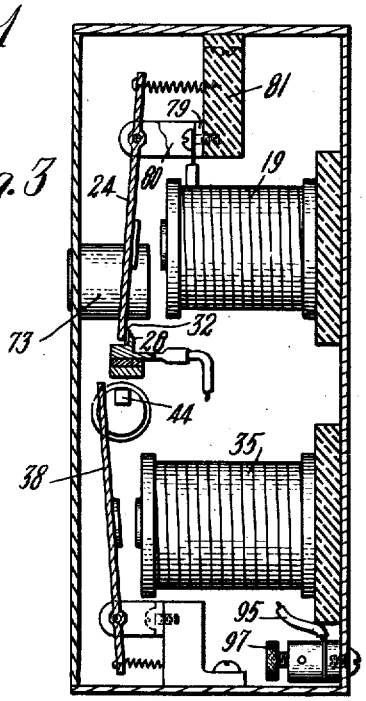
Fig. 3
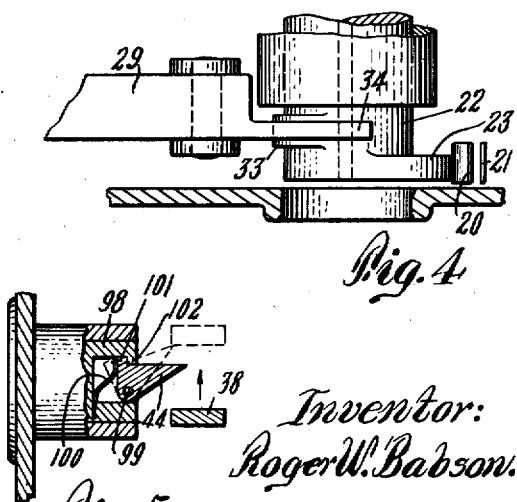
Fig. 4
Fig. 5
Inventor:
Roger W. Babson.
by Wright, Brown, Quinby & May
Attys.

Aug. 29, 1933.  R. W. BABSON  1,924,533
AUTOMOBILE PARKING METER WITH THEFT ALARM
Filed Aug. 22, 1929  2 Sheets-Sheet 2
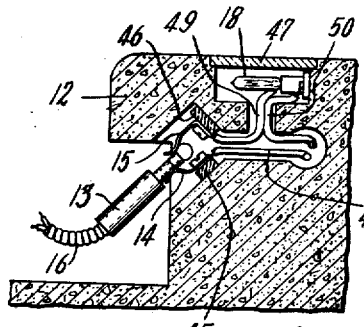
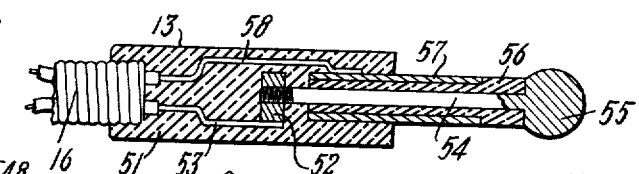
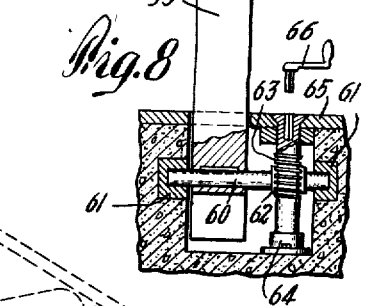
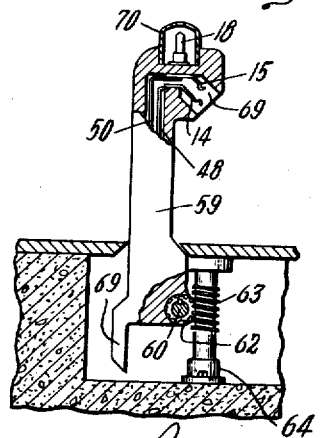
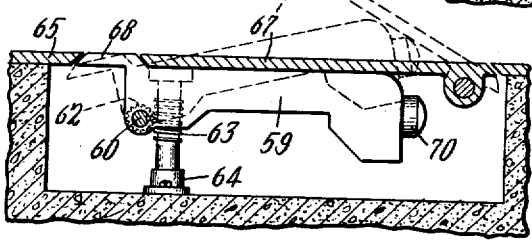
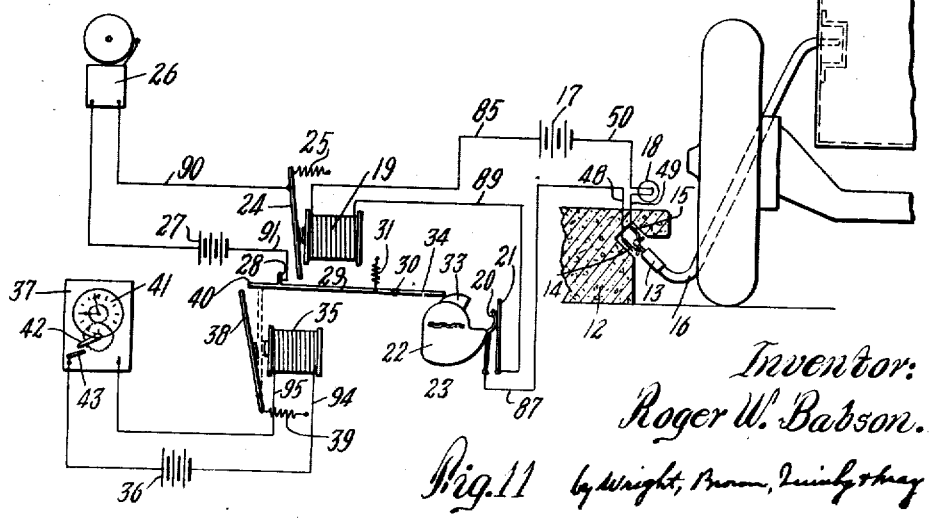
Inventor:
Roger W. Babson.

Patented Aug. 29, 1933

1,924,533

UNITED STATES PATENT OFFICE 1,924,533

AUTOMOBILE PARKING METER WITH THIEF ALARM

Roger W. Babson, Wellesley, Mass.

Application August 22, 1929. Serial No. 387,756

13 Claims. (Cl. 177—311)

The object of this invention is to provide an apparatus or means for connection with a parked automobile to cause payment to the municipality for use of public streets as parking spaces (or to the owner of private property on which the car may be parked, or to both) and to give to the car owner the protection against theft afforded by a burglar alarm, as well as protection against liability of being examined by the authorities to answer for unlicensed parking. The apparatus or means in which the invention consists is applicable and useful in many situations where cars may be parked on either public streets or private property, but the present embodiment of it has been designed and intended particularly for the use and protection of car owners who live in apartment houses and have no convenient garage facilities for housing their cars and find it practically necessary to park them over night in an adjoining or nearby street.

In many cities, particularly those which have a mild winter climate, people without garage facilities near their residences customarily leave their cars all night in the public streets. Especially is this done by apartment house dwellers. Indeed in many cities there are not garage facilities enough to house all, or even a majority, of the cars owned by the inhabitants, so that over night parking out of doors is inevitable for many persons. Cars so left are especially exposed to the danger of being stolen, and are liable to be tagged by a policeman in case permissible free parking time is limited.

In recognition of these facts, I have devised a means by which payment may be exacted for the privilege of using public streets as parking spaces, and by which instant warning may be given of an attempt to steal a car so parked. The invention consists in the principles of means for these purposes, severally and collectively, disclosed in the present specification, in the specific means here disclosed, and in all substantial equivalents of said specific means containing the same essential principles. It is to be noted that while the theft alarm is herein set forth as a part of the complete apparatus, other features of the apparatus are usable without this alarm, and that I claim protection for all phases or parts of the invention separately and individually, as well as collectively.

In now proceeding to describe one embodiment of the invention as illustrated by the drawings herewith, I desire to point out that this embodiment is illustrative and not limiting of the invention, and that the principles thereof may be embodied in many diverse forms of means and apparatus without departing from the scope of protection herein claimed.

Referring to the drawings,—

Fig. 1 is a face view of a closed box containing coin-controlled electric circuit closing means forming a part of the complete apparatus of the invention adapted to be placed in a conveniently accessible location in a dwelling or other building;

Fig. 2 is a similar view of the box, with the cover removed, showing the parts housed therein;

Fig. 3 is a cross section of the box and contained apparatus, taken on line 3—3 of Fig. 2; shown on an enlarged scale;

Fig. 4 is a detail sectional plan view of certain parts of the apparatus, taken on line 4—4 of Fig. 2, and shown on an enlarged scale;

Fig. 5 is a detail sectional plan view of the locking device which forms part of the apparatus, taken on line 5—5 of Fig. 2;

Fig. 6 is a sectional view through the curb of a sidewalk showing parts of the apparatus embedded therein and provided for connection with a parked automobile;

Fig. 7 is a detail sectional view of a plug which is connected with the automobile and adapted to be inserted in the curb socket;

Figs. 8 and 9 are sectional elevations taken at right angles to one another showing a different form of sidewalk socket for the same purpose as that shown in Fig. 6 but adapted to be raised when in use and housed within the curb when out of use;

Fig. 10 is a sectional view similar to Fig. 9 showing this alternative socket housed and concealed within the sidewalk curb;

Fig. 11 is a diagram of the entire apparatus illustrating its electrical and mechanical features in connection with a parked automobile.

Like reference characters designate the same parts wherever they occur in all the figures.

The essentials of the invention will be most readily understood by reference to the diagram of Fig. 11 and an explanation thereof.

In the curb 12 at the edge of the sidewalk is a socket adapted to receive a plug 13 connected to the parked automobile, a fragment of which is shown in the diagram. This socket is preferably recessed within the side of the curb so as not to be injured if, as frequently happens, a car is run so close to the curb that its wheels rub against it. The socket contains separated contacts 14 and 15 which are in separate connection with the conductors of an electric circuit and are adapted to make contact respectively with conductive areas of the plug 13 which are insulated from one another and separately connected with the wires of a cable 16 attached to the car. The cable may be fastened to and coiled on a spring controlled drum mounted securely and protectively housed in any convenient part of the car, and may be armored so that it cannot be easily cut. The conductors of this cable are connected together at their end remote from the plug, that is, the end of the cable housed within the car, and form a closed circuit with the contacts 14 and 15 as soon as the plug is inserted in the socket.

In circuit with the conductors 14 and 15 is a source of electric current, represented conventionally in the diagram as a battery 17, a signal light 18, an electro magnet 19, and the normally separated contacts 20 and 21 of a key controlled switch. Obviously the conductors of the cable 16 may perform service in addition to that of merely closing a gap in the electric power circuit, as above stated. For instance, they may be used to deliver current to lights in the car, or to electric heating equipment arranged to prevent freezing of the circulating water and other chilling effects in cold weather, etc. without any depletion of the charge in the storage battery of the car.

The controlling means for the last named switch consists of a lock, preferably coin-controlled, having a rotatable element, such as a cylinder 22 adapted to be turned by a key from the position shown in Fig. 2 to that of the diagram, Fig. 11, and having a cam element 23 which, when the lock cylinder is so turned, brings contact 20 against contact 21.

The armature 24 of electro magnet 19 is acted on by a spring 25 which tends to remove it from the magnet. As shown in the diagram, it is pivoted and arranged so that its arms at opposite sides of the pivot are pulled upon in the same direction by the magnet and the spring, respectively. The pull of the magnet, when exerted, is stronger than the constantly acting pull of the spring. The armature is also in electrical connection with a theft alarm device 26, shown here as an electric gong, but permissibly being any other suitable signal device, and with a source of electricity 27. The source 27 is likewise connected electrically with a contact abutment 28 at a short distance from the armature when the latter is attracted by the magnet, but in its path of movement and arranged to be contacted by the armature when the latter is released from the magnet and withdrawn by spring 25.

Said contact abutment is a projection 28 carried by a lever 29, which is pivoted at 30 and acted on by a spring 31 so that it tends to assume the position shown in the diagram and also in Figs. 2 and 3. Said projection is provided with a facing of insulating material 32 on its side away from the magnet, in order that, when it makes contact on that side with the armature, the alarm circuit will not be closed. Otherwise the projection is of electrically conductive material, as is also the armature 24, at least as to that part which contacts with the projection and is connected with the alarm device 26. These elements cooperate as a circuit closer for the alarm circuit.

The key cylinder 22 carries a wiper 33 which normally underlies an arm 34 of lever 29 and, when the key is turned, first raises said arm to depress the projection 28 out of the way of armature 24, and then passes by the end of lever arm 34 and releases it.

It will be apparent from the foregoing that the circuit of magnet 19 is closed only by insertion of the automobile plug 13 and rotation of the lock cylinder 22. The cam elements 23 and 33 of the lock cylinder are so disposed that the former closes the switch contacts 20, 21 before the latter releases lever arm 34 after having displaced the abutment projection or stop 28 from the armature 24. Thus the armature 24 is attracted and moved by the magnet, from a normal position at the left of the stop (Figs. 3 and 11), while the key is being turned; and, then upon completion of the turning of the key, stop 28 is brought into the path of movement of the armature with its conductive side next to the armature. The signal light 18 is caused to glow as soon as the switch contacts 20, 21 are closed, and shows to all concerned that the automobile is connected with the meter and alarm apparatus. If now the plug 13 is withdrawn or the cable 16 is cut, the circuit of magnet 19 is instantly broken; the armature 24 is released and the control circuit of the alarm 26 is completed, which gives immediate notice that an unauthorized removal of the car is being attempted. The alarm device may be located in the building occupied by the car owner, or externally so as to arouse the entire neighborhood when it is sounded, or in the nearest police station in association with a telltale to show the location of the parking place; or a number of such alarm devices may be put in two or all of these places, or elsewhere as well. As the connections are all electrical, the apparatus is extremely flexible, whence its parts may be placed anywhere most convenient for the users and the police, whether near or far from the location of the car.

The car can be removed from its parking place without setting off the alarm only by returning the lock to its original position. In being so returned, the lock wiper 33 displaces stop 28 from the path of armature 24, and holds it so until the receding surface of cam 23 permits the switch 20—21 to open. Part of my invention contemplates prevention of such return of the lock if the car has been parked beyond the time allowed for a prescribed payment. To do this I have provided a second electro magnet 35, in circuit with a source of current 36 and a time controlled switch 37. The armature 38 of this second electro magnet is normally held away from the magnet by a spring 39 but is arranged to pass, when attracted, under the extremity 40 of lever 29, thus preventing depression of this end of the lever, and also locking the arm 34 in the path of the wiper 33 on the lock cylinder, so that the latter cannot be turned back.

The time switch 37 may be of any suitable character, known or otherwise. For instance, it may consist of an ordinary clock 41, the movement of which is geared to a switch arm or segment 42 so that the latter is rotated once in twenty four hours, or at any other desired rate, and the segment is coupled with one side of the circuit and coacts with a contact 43 connected in the other side of the circuit. When the armature 38 has been attracted, it is held in its blocking position (shown dotted in Fig. 11) by a lock 44 (Figs. 3 and 5), later described in detail, which can be released only by a duly authorized person with whom a financial adjustment must be made for the over time parking.

Describing in fuller detail the apparatus thus diagrammatically illustrated, attention is directed first to Figs. 6 and 7 for a showing of the curb connection with the automobile. In Fig. 6 the contacts 14 and 15 are shown as springs secured by screws to blocks or bars 45 and 46 embedded in a concrete curb, in a recess which opens downwardly and is protected by an overhanging ledge of the curb. The signal light 18 is mounted in a socket in the upper side of the curb covered and protected by a pane of heavy glass 47. These parts may all be encased in a single housing which may be suitably set into the curb at the time of laying, or afterwards. 48, 49 and 50 represent the electrical conductors which are similarly designated in the diagram.

The plug connected to the automobile is preferably made of an insulating body 51 in which is embedded a conducting block 52 connected to one of the wires (53) of the cable 16. A rod 54 of conducting material makes contact with the block 52, protrudes from the body 51, and terminates in a knob 55 adapted to engage the contact 15. A sleeve 56 of insulating material surrounds the rod 54 and in turn is surrounded by conducting sleeve 57, the latter being connected electrically with the other conductor (58) of the cable. Sleeve 56 also has a shoulder abutting against the outer end of sleeve 57 and preventing the sleeve from slipping into contact with knob 55.

The alternative form of socket, shown in Figs. 8, 9 and 10, is normally housed in a chamber in the curb, and is adapted to be brought to an upright position, projecting above the curb, when in use. It consists of a post 59 secured to a shaft 60, the latter being mounted in bearings 61 at opposite sides of the cavity in which the post is normally housed. A gear 62 is mounted on shaft 60 and meshes with an upright screw 63, the lower end of which is journaled in a step bearing 64 at the bottom of the cavity, and its upper end is journaled in the fixed part of the cavity cover 65 and has a socket to receive a detachable crank 66. A pivoted cover element 67 overlies the post 59 when housed and closes the cavity when the post is raised. The latter has a web 68 arranged to close the gap between the fixed cover section 65 and the pivoted section 67 when the post is housed. The free end of the post has a lateral enlargement in which is a downwardly open socket 69 containing the contacts 14 and 15, and in its extremity is a socket covered by a rugged transparent cap 70 in which is housed the signal light 18. The conductors 48 and 50 run through a passage in the post 59 and thence to a conduit through the sidewalk with slack enough to avoid injury from repeated raising and lowering of the post. If the post is made of metal for strength, the conductors and contacts are suitably insulated therefrom.

The wires from the curb socket are carried in any convenient fashion to a box 71 in which are placed the switch 20—21, the electro magnets 19 and 35, and the control lever 29. The box is placed in any convenient location in the adjacent dwelling. For instance, in the case of an apartment house it may be placed in the lobby; and a number of such boxes may be placed side by side in that case, each coupled with one of a number of sockets ranged along the curb of the sidewalk which borders the lot occupied by the building. The curb sockets and corresponding boxes and keys are identified by the same numbers or other symbols. The box is equipped with a hinged door 72 having a lock 73 adapted to be opened by an authorized person.

The lock 22 provided for operation by the car owner may be mounted in the cover 72 or any other accessible part of the box. This lock is supported in any suitably convenient manner so as to operate the switch and control lever as previously described. It includes a rotatable cylinder 22 on one end of which the cam and wiper elements 23 and 33 are mounted in different planes, as shown in Fig. 4, so that neither will interfere with the part operated by the other. I have not shown this lock in any further detail because it is, or may be, of a well known type adapted to be turned by an inserted key and having provisions for limiting its movement and preventing its operation by any key except the one designed for it. It is designed for control by a coin or the like. Fig. 1 shows illustratively a simple coin controlled detent for this lock, which may be taken as typifying a variety of devices which may be used for the purpose, rather than as representing the only thing which can be used. A coin chute 74 is mounted on the back of the door 72, having an entrance slot at the top of the box. A latch lever 75 is pivoted to the door and has an arm which overlies the lock cylinder 22, and is formed with a hook 76 adapted to engage a shoulder on the cylinder, or the edge of the inserted key, to prevent turning of the cylinder until a coin has been deposited. A tail piece or finger 77 on the latch protrudes into the coin chute so as to be depressed by the falling coin to raise the latch lever and disengage it from the lock. A detent not shown, of well known character, may be provided to arrest the coin when it has thus displaced the latch lever, and also means operated by rotation of the lock for leasing the detent. The released coin then drops into a coin receptacle 78 in the box or casing 71. I have not attempted to show more than the illustrative principle of this coin controlled latch, since so many various devices well understood by those skilled in the art may be applied effectively for the same purpose, all within the spirit and scope of the present invention.

The magnet armature 24 is supported by a pivot 79 mounted in lugs 80 of conducting material which are secured to an insulating block 81. The armature lever 38 of the second electro magnet is similarly mounted on a pivot 82 held by lugs 83 of block 84 on the bottom of the casing.

In Fig. 2, 85 represents the conductors leading to the electro magnet 19 from a binding post 86 through which connection is made with the source of current and one of the conductors from the sidewalk socket. 87 is a conductor leading to the switch contact 20 from a binding post 88 with which the other conductor from the sidewalk socket is connected. 89 is a conductor from the switch contact 21 to the electro magnet 19. 90 is the conductor which connects the alarm device with the magnet armature 24, and 91 the conductor on the other side of the alarm circuit which leads to the projection 28. These conductors are coupled with the external leads to the current source and the alarm through binding posts 92 and 93. Conductors 94 and 95 lead to the magnet 35 from binding posts 96 and 97 through which they are coupled electrically with the time switch 37 and current source 36.

The current sources for energizing the magnets 19 and 35 and for operating the alarm signal 26 are all shown in the diagram as independent batteries. This, however, is simply for convenience and clarity of illustration. They may indeed be separate batteries, or parallel connections from a single battery, but are preferably branches from the lighting or power circuit of the building, transformed or reduced to low voltage and low current strength if desired. The latter is the logical source of power. It is immaterial, however, from what source power is derived except that it be from a source external to the storage battery of the automobile, which makes possible the sounding of the alarm when the connection with the automobile is interrupted, as well as avoiding depletion of that battery.

The time switch 37 may be connected with any clock in the building or elsewhere, or may be a special switch located in an apartment house or in some other building, such as an office of the municipality. The same time switch may be in circuit with the detent controlling magnets of a large number of coin controlled boxes.

The lock 44 for the magnet armature 38 which serves as a detent to obstruct lever 29 and prevent the parked car from being released if it has remained connected after a given hour, is a latch protruding from the inner end of a cylinder 98 (Fig. 5) forming part of a key operated lock mounted in a wall of the box 71 and adapted to be turned only by a certain inserted key. Latch 44 is connected to the cylinder by a pivot 99 and pressed on by a spring 100 so that its shoulder 101 engages a shoulder 102 on the cylinder, making the latch rigid in one direction while able to yield in the opposite direction. It is normally located so that it yields in the direction in which the armature 38 is moved by the magnet 35, so that it permits this armature to be shifted from the full line position to the dotted line position shown in Figs. 5 and 11, but prevents return of the armature even after the magnet circuit is again broken. But rotation of cylinder 98 through a half turn reverses the latch and permits the armature to be brought back by its spring 39 to the full line position. The key of this last described lock is in the possession of a person who is authorized to collect payment for the excess parking time, from the car owner. The same key may be designed to fit the corresponding locks of all the boxes in the same building.

The person wishing to park his car under the protection given by this invention, places the attached contact plug in any convenient curb socket beside the apartment building. He notes the number of the socket and, on entering the building, seeks the box bearing the corresponding number. The key for manipulation by the car owner is in the lock but is prevented from turning by the coin controlled latch. The car owner deposits the coin of prescribed value in the slot and turns the key, removing it from the lock afterwards. This completes the circuit through the cable attached to the car and causes the magnet armature 24 to be attracted and placed in the position shown in Fig. 11. The light at the curb beside the car then glows and informs the policeman or watchman on duty in the locality, as well as any potential thieves, that the car is legitimately parked and under protection of the theft alarm. If a thief attempts to remove the car, the theft alarm is immediately sounded. When the car owner desires to drive his car away he inserts the key in the lock and returns the lock cylinder to previous position, breaking the circuit and enabling him to withdraw the plug without sounding the alarm. But if the car owner should leave his car beyond the limit paid for by the deposited coin, the lock is blocked so that he cannot turn it back until he has made the necessary financial adjustment with the person in charge. Thus this invention affords the community a means for collecting a financial return for use of residential streets as parking places, and the car owner is given a means by which, for a prescribed payment, he is safeguarded against prosecution for using the street as a parking place and against theft of the car during the night.

What I claim and desire to secure by Letters Patent is:—

1. The combination with an automobile, of a socket external to the automobile including separate electrical contacts in a fixed location, a circuit closer in armored mechanical connection with the automobile adapted to be inserted detachably between said contacts for completing the circuit therewith, a key operated switch and a source of electric current, fixed in location relatively to the automobile, in circuit with said contacts, a signal in the same circuit arranged to give an indication while said switch is closed and said closer is in the socket, an electro magnet in the same circuit, a separate theft alarm circuit, and a switch for the theft alarm and circuit therefor operated by said magnet to open the theft alarm circuit when the magnet is active and to close the latter circuit when the magnet is made inactive by removal of the circuit closer.

2. An automobile parking system comprising a source of electric current, a normally open coin controlled switch, and a signal, all in circuit with one another, separated contacts interposed in said circuit in fixed location relatively to an automobile, and a closed circuit cable connected to an automobile having separated terminals adapted to be engaged each with one of said contacts to complete the circuit between the latter.

3. An automobile parking system comprising a source of electric current, and a signal in circuit with one another, separated contacts interposed in said circuit in fixed location relatively to an automobile, a closed circuit cable connected to an automobile having separated terminals adapted to be engaged separately with said contacts to complete the circuit between the latter, a normally open switch in said circuit closing of which operates said signal, and coin controlled means releasable by deposit of a coin to permit closing of said switch.

4. An automobile parking system comprising the combination with the parked automobile of a closed circuit conductor secured to the automobile having electrically separated terminals, an external circuit in fixed location relatively to the automobile including a source of current, a normally open switch, a signal, an electro magnet, and separated terminals arranged to be put in conducting contact respectively with the first named terminals, a coin-controlled switch closer operable after deposit of a coin to close said switch, and another circuit including an alarm device and a circuit closer controlled by said electro magnet.

5. An automobile parking system comprising the combination with the parked automobile of a closed circuit conductor secured to the automobile having electrically separated terminals, an external circuit in fixed location relatively to the automobile including a source of current, a normally open switch, a signal, an electro magnet, and separated terminals arranged to be put in conducting contact respectively with the first named terminals, a coin-controlled switch closer operable after deposit of a coin to close said switch, and another circuit including an alarm device and a circuit closer shiftable to open circuit position by said electro magnet and into circuit closing position when the magnet is de-energized.

6. An automobile parking system comprising an electric circuit in fixed location relatively to the automobile including a source of current external to the automobile, a pair of separated electrical terminals in said circuit, a connector attached to the automobile to be parked displaceably connectible electrically with said terminals for closing the gap between them, a coin controlled lock, a switch in said circuit operated by said lock, an obstructor adapted to prevent movement of said lock which causes the switch to be opened, said obstructor being normally inoperative for the purpose specified, and time controlled means for making said obstructor operative for that purpose at a predetermined time.

7. An apparatus of the character set forth comprising an electric circuit including a source of current, an electro magnet, a switch, and separated terminals in fixed location relatively to the automobile, a circuit closer connector attached to an automobile engageable with said separated terminals for completing the circuit between them, a manually operated coin controlled lock for closing and opening said switch, an electric alarm circuit including a circuit closer movable in one direction by attraction of said magnet and in the opposite direction when such attraction ceases, a contact element in circuit with said alarm device and in the path of movement of said circuit closer, but separated therefrom when the latter is in the position in which it is placed by the unobstructed force of the magnet, and means operated by movement of said lock when opening said switch for displacing said complemental contact out of the path of the circuit closer.

8. In an apparatus of the character described, a coin controlled manually operable lock, an electric switch arranged to be closed by movement of said lock from one position to a second position, a source of electric current and an electro magnet in circuit with said switch, an armature for said electro-magnet, a second circuit including an alarm device and a circuit closer, said circuit closer including said armature and a complemental contact element, a lever carrying said contact element and normally holding the same at a point between the limits of movement of said armature and across its path, but separated from the position occupied by the armature when attracted by the magnet, said lever being operable by the lock when moving from its second named to its first position so as to displace the complemental contact out of said path, said apparatus and the parts thereof being in fixed locations relatively to an automobile parked in connection therewith.

9. In an apparatus of the character described, a coin controlled manually operable lock, an electric switch arranged to be closed by movement of said lock from one position to a second position, a source of electric current and an electro magnet in circuit with said switch, an armature for said electro-magnet, a second circuit including an alarm device and a circuit closer, said circuit closer including said armature and a complemental contact element, a lever carrying said contact element and normally holding the same at a point between the extreme positions, and in the path of movement, of said armature and separated from the magnet-attracted position of the armature, said lever being operable by the lock when moving from its second named to its first position so as to displace the complemental contact out of said path, and time controlled means for preventing such movement of said lever at and after a predetermined time point, said apparatus and the parts thereof being in fixed locations relatively to an automobile parked in connection therewith.

10. In an apparatus of the character described, a coin controlled manually operable lock, an electric switch arranged to be closed by movement of said lock from one position to a second position, a source of electric current and an electro magnet in circuit with said switch, a second circuit including an alarm device and a circuit closer, said circuit closer including a switch member attractable and releasable by said electro magnet and a complemental contact element, a lever carrying said contact element and normally holding the same out of contact with said switch member when the latter is attracted by the magnet, and at a point within the path of movement of the switch member, said lever being operable by the lock when moving from its second named to its first position so as to displace the complemental contact out of said path, a detent adapted to prevent such movement of said lever and being normally inoperative for that purpose, an electro magnet for shifting said detent into obstructing position when energized, and a time switch organized to close the circuit of the last named electro magnet, said apparatus and the parts thereof being in fixed locations relatively to an automobile parked in connection therewith.

11. In an apparatus of the character described, a coin controlled manually operable lock, an electric switch arranged to be closed by movement of said lock from one position to a second position, a source of electric current and an electro magnet in circuit with said switch, a second circuit including an alarm device and a circuit closer, said circuit closer including a switch member attractable and releasable by said electro magnet and a complemental contact element, a lever carrying said contact element and normally holding the same at a point between the attracted and released positions of said switch member and in its path of movement, said lever being operable by the lock when moving from its second named to its first position so as to displace the complemental contact out of said path, time-controlled means for obstructing such displacement of the lever, and an automatic manually releasable lock for holding said obstructing means in its obstructing position, said apparatus and the parts thereof being in fixed locations relatively to an automobile parked in connection therewith.

12. An automobile parking system comprising the combination with a building and an automobile parked outside of said building, of a key operated electric switch installed in said building, separated electrical terminals in fixed location external to said building adjacent to the automobile in circuit with said switch and with a source of electric current, an attachment to the automobile including circuit closing means insertable removably into circuit making connection with said separated contacts, an electrical theft alarm, complemental circuit closing elements for said theft alarm, each movable independently of the other, an electro-magnet in the circuit of said switch and contacts for retracting one of said elements from the complemental element, means biasing the first element for movement into contact with the second element when released from the influence of said magnet, and means controlled by said key operated switch for displacing the second circuit closing element out of the path of the first element when said switch is placed in position for opening the first named circuit.

13. An automobile parking system comprising the combination with a building and an automobile parked outside of said building, of a key operated electric switch installed in said building, separated electrical terminals in fixed location external to said building adjacent to the automobile in circuit with said switch and with a source of electric current, an attachment to the automobile including circuit closing means insertable removably into circuit making connection with said separated contacts, an electrical theft alarm, a circuit closing element therefor, an electro-magnet in the first named circuit for holding said element in open circuit position means normally biasing the element to closed circuit position, a complemental circuit closing element, means controlled by said key operated switch for placing said complemental element into position for cooperation with the first named circuit closing element when said key operated switch is closed and for shifting it out of such cooperating relationship when the key switch is in course of being opened, an obstructor for preventing such displacement of the complemental circuit closing element, being normally in non-obstructing position, a time mechanism, and means controlled by said time mechanism for putting said obstructor into obstructing position at predetermined times.

ROGER W. BABSON.

CERTIFICATE OF CORRECTION.

Patent No. 1,924,533.　　　　　　　　　　　　　　　　August 29, 1933.

ROGER W. BABSON.

It is hereby certified that error appears in the printed specification of the above numbered patent requiring correction as follows: In the grant and in the heading to the printed specification, title of invention, for "THIEF" read "THEFT"; and that the said Letters Patent should be read with these corrections therein that the same may conform to the record of the case in the Patent Office.

Signed and sealed this 24th day of October, A. D. 1933.

F. M. Hopkins (Seal)　　　　　　　　　　　　　　　　Acting Commissioner of Patents.

the complemental element, means biasing the first element for movement into contact with the second element when released from the influence of said magnet, and means controlled by said key operated switch for displacing the second circuit closing element out of the path of the first element when said switch is placed in position for opening the first named circuit.

13. An automobile parking system comprising the combination with a building and an automobile parked outside of said building, of a key operated electric switch installed in said building, separated electrical terminals in fixed location external to said building adjacent to the automobile in circuit with said switch and with a source of electric current, an attachment to the automobile including circuit closing means insertable removably into circuit making connection with said separated contacts, an electrical theft alarm, a circuit closing element therefor, an electro-magnet in the first named circuit for holding said element in open circuit position means normally biasing the element to closed circuit position, a complemental circuit closing element, means controlled by said key operated switch for placing said complemental element into position for cooperation with the first named circuit closing element when said key operated switch is closed and for shifting it out of such cooperating relationship when the key switch is in course of being opened, an obstructor for preventing such displacement of the complemental circuit closing element, being normally in non-obstructing position, a time mechanism, and means controlled by said time mechanism for putting said obstructor into obstructing position at predetermined times.

ROGER W. BABSON.

CERTIFICATE OF CORRECTION.

Patent No. 1,924,533.   August 29, 1933.

ROGER W. BABSON.

It is hereby certified that error appears in the printed specification of the above numbered patent requiring correction as follows: In the grant and in the heading to the printed specification, title of invention, for "THIEF" read "THEFT"; and that the said Letters Patent should be read with these corrections therein that the same may conform to the record of the case in the Patent Office.

Signed and sealed this 24th day of October, A. D. 1933.

F. M. Hopkins (Seal)   Acting Commissioner of Patents.

CERTIFICATE OF CORRECTION.

Patent No. 1,924,533. August 29, 1933.

ROGER W. BABSON.

It is hereby certified that error appears in the printed specification of the above numbered patent requiring correction as follows: In the grant and in the heading to the printed specification, title of invention, for "THIEF" read "THEFT"; and that the said Letters Patent should be read with these corrections therein that the same may conform to the record of the case in the Patent Office.

Signed and sealed this 24th day of October, A. D. 1933.

F. M. Hopkins (Seal) Acting Commissioner of Patents.